United States Patent
Lee

(10) Patent No.: US 7,958,294 B1
(45) Date of Patent: Jun. 7, 2011

(54) INTEGRATED CIRCUIT HAVING DATA TRANSCEIVERS AND METHOD OF POSITIONING CIRCUITS ON AN INTEGRATED CIRCUIT

(75) Inventor: Thomas Anthony Lee, Lakeville, MN (US)

(73) Assignee: Xilinx, Inc., San Jose, CA (US)

( * ) Notice: Subject to any disclaimer, the term of this patent is extended or adjusted under 35 U.S.C. 154(b) by 1232 days.

(21) Appl. No.: 10/993,583

(22) Filed: Nov. 19, 2004

(51) Int. Cl.
*G06F 13/42* (2006.01)
*H01L 25/00* (2006.01)

(52) U.S. Cl. .............................. 710/106; 710/71; 326/41

(58) Field of Classification Search .............. 710/71–74, 710/104, 105, 305, 316, 317; 326/41, 37–39
See application file for complete search history.

(56) References Cited

U.S. PATENT DOCUMENTS

| | | | | |
|---|---|---|---|---|
| 5,654,564 | A * | 8/1997 | Mohsen | 257/209 |
| 6,563,340 | B1 * | 5/2003 | Jones | 326/41 |
| 7,062,586 | B2 * | 6/2006 | Donlin et al. | 710/305 |
| 7,068,072 | B2 * | 6/2006 | New et al. | 326/47 |
| 7,086,025 | B1 * | 8/2006 | Yang | 716/8 |
| 2005/0007147 | A1 * | 1/2005 | Young | 326/41 |
| 2005/0058187 | A1 * | 3/2005 | Groen et al. | 375/219 |
| 2005/0256969 | A1 * | 11/2005 | Yancey et al. | 709/238 |
| 2006/0190516 | A1 * | 8/2006 | Simkins et al. | 708/490 |

OTHER PUBLICATIONS

RocketPHY Configuration Utility, Xilinx, Oct. 19, 2004.*
Get Up to Multi-Gigabit Speed with the SPECTRAQuest Design Kit, Cadence Design Systems, 2002.*
Stratix GX Multi-Gigabit Transceiver Block Technical Details. Altera. Copyright 1995-2006.*
Definition of Integrated Electronic Circuits from <http://www.electronics-manufacturers.com>.*
U.S. Appl. No. 10/618,404, filed Jul. 11, 2003, Young.
U.S. Appl. No. 10/661,016, filed Sep. 11, 2003, Groen et al.
U.S. Appl. No. 10/683,944, filed Oct. 10, 2003, Young.
U.S. Appl. No. 10/836,722, filed Apr. 30, 2004, Vadi et al.
U.S. Appl. No. 10/993,607, filed Nov. 19, 2004, Lee.
U.S. Appl. No. 10/993,863, filed Nov. 19, 2004, Lee et al.
U.S. Appl. No. 10/993,886, filed Nov. 19, 2004, Lee.

* cited by examiner

*Primary Examiner* — Khanh Dang
(74) *Attorney, Agent, or Firm* — John J. King

(57) ABSTRACT

An integrated circuit having a plurality of data transceivers positioned on opposite ends of the integrated circuit is disclosed. The integrated circuit comprises a first plurality of data transceivers positioned in a column on a first end of the integrated circuit and a second plurality of data transceivers positioned in a column on a second end. A circuit is preferably positioned between the first plurality of data transceivers and the second plurality of data transceivers. The circuit could comprise, for example, circuits for implementing a programmable logic device. The circuitry of the plurality of data transceivers is also preferably arranged such that analog circuitry is positioned closer to an end of the integrated circuit than the digital circuits to reduce interference with the analog circuits. According to another aspect of the invention, the data transceivers are formed on layers to reduce the amount of interference.

20 Claims, 4 Drawing Sheets

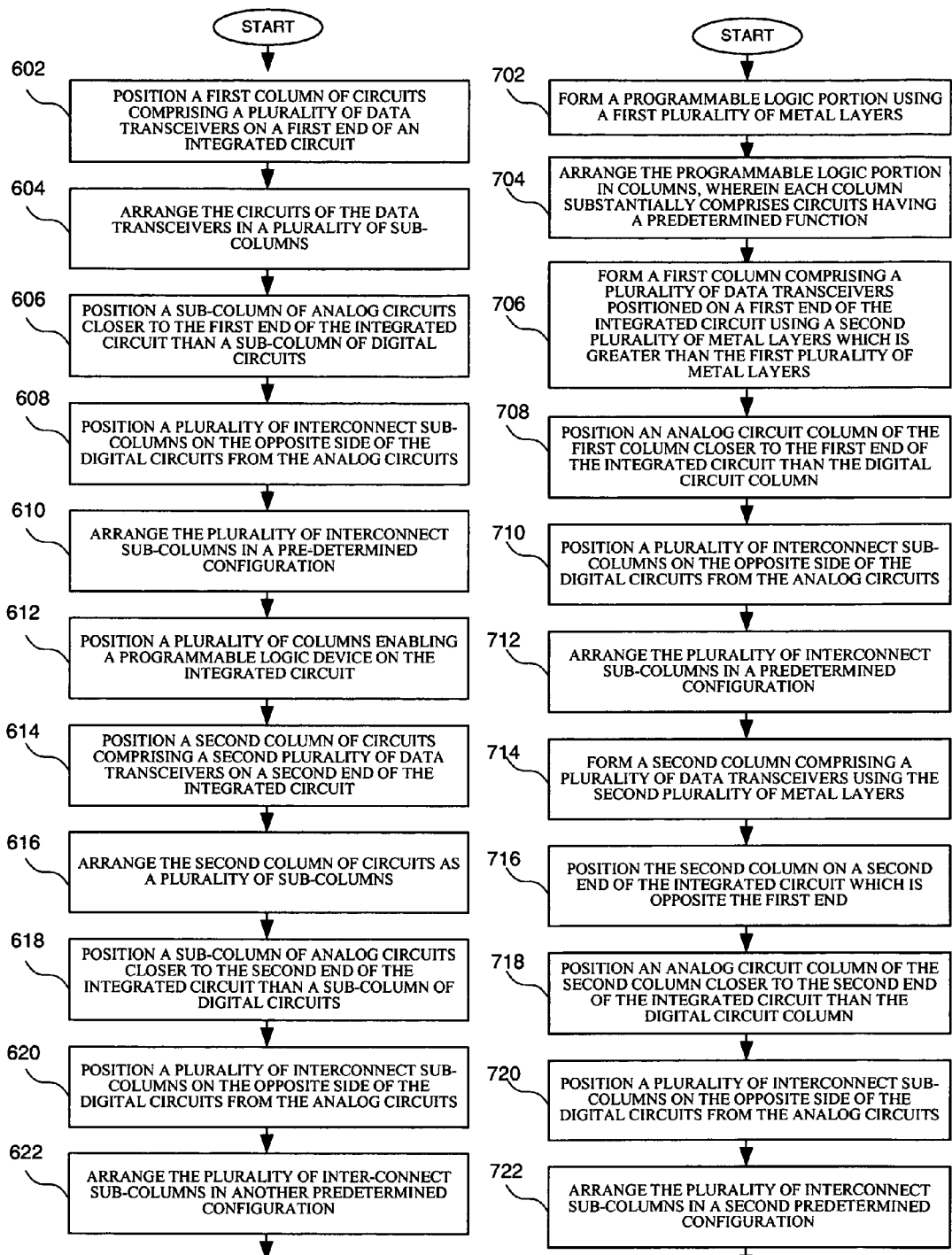

INTEGRATED CIRCUIT HAVING DATA TRANSCEIVERS AND METHOD OF POSITIONING CIRCUITS ON AN INTEGRATED CIRCUIT

FIELD OF THE INVENTION

The present invention relates generally to integrated circuits, and in particular, to an integrated circuit having a plurality of data transceivers, and a method of positioning circuit elements on an integrated circuit.

BACKGROUND OF THE INVENTION

Within electronic circuits or systems, communication takes place at various levels and distances, including on an integrated circuit (IC), within a printed circuit board (PCB) or card, between PCBs within a chassis, and between equipment or chassis. The transfer of data, such as between integrated circuits or between cards on a backplane, is often required in a digital system design. Transferring data by way of a serial communications channel has become increasingly important. Serial communications channels make greater use of the available resources, such as the number of pins used to transfer data. System interface standards address increasing bandwidth requirements between IC components, line cards, and systems. However, as data rates exceed 1 Gbps, new challenges arise for system designers. Numerous technology advancements and capabilities are associated with current advanced serial interfaces. To successfully design and deploy products using multi-gigabit serial links, the signaling channel must be carefully designed with the aid of high-accuracy channel simulation models.

One of the most important advantages of serial interface technologies is cost reduction. While cost premiums may be acceptable for a short time, long-term cost advantages are necessary to ensure that a given technology will be adopted and supported. Even at high performance levels, serial interfaces help reduce connector costs, package costs, and possibly board costs. High speed I/O and connectivity allow digital systems to achieve breakthrough performance processing. Accordingly, serial interfaces will result in better performance scalability, interconnect density, pin count reduction, cost containment, and greater capacity.

As data transfer speeds have increased, high-speed differential serial lines have replaced large parallel buses in many designs. A Serializer/Deserializer (SERDES) converts parallel data into differential serial data, and differential serial data into parallel data. While parallel interfaces will remain essential to the core of traditional monolithic uniprocessor or multiprocessor platforms, many I/O grade interfaces will become serial. Recently, serial interconnect technologies have matured to enable high-speed switched architectures with excellent performance and scalability, as well as low pin counts and cost. Clock speeds have increased from 33-133 MHz using parallel connectivity, to 2-10 GHz using serial connectivity.

However, signal integrity is critical for data throughput in high speed serial channels. Accordingly, there is a need for an improved integrated circuit having data transceivers and method of positioning circuit elements on an integrated circuit.

SUMMARY OF THE INVENTION

An integrated circuit having a plurality of data transceivers positioned on opposite ends of the integrated circuit is disclosed. The integrated circuit comprises a first plurality circuit elements of data transceivers positioned in a column on a first end of the integrated circuit. A second plurality of circuit elements of data transceivers could also be positioned in a column on a second end of the integrated circuit. Other circuits are preferably positioned between the first plurality of data transceivers and the second plurality of data transceivers. The other circuits could comprise, for example, circuits for implementing a programmable logic device. The circuitry of the plurality of data transceivers is also preferably arranged such that analog circuitry is positioned closer to an end of the integrated circuit than the digital circuits to reduce interference with the analog circuits.

According to another aspect of the invention, the data transceivers are preferably formed on layers to reduce the amount of interference from adjacent circuits. In particular, a method of positioning circuit elements of an integrated circuit is described. The method comprises steps of forming a programmable logic portion using a first plurality of metal layers; and forming a first column comprising a plurality of data transceivers positioned on a first end of the integrated circuit using a second plurality of metal layers which is greater than the first plurality of metal layers. A second column comprising a plurality of data transceivers could also be positioned on a second end of the integrated circuit using the second plurality of metal layers.

BRIEF DESCRIPTION OF THE DRAWINGS

FIG. 6 is a flow chart showing a method of position circuit elements in an integrated circuit according to an embodiment of the present invention; and FIG. 7 is a flow chart showing a method of forming an integrated circuit according to an embodiment of the present invention.

DETAILED DESCRIPTION OF THE DRAWINGS

Figure 1:
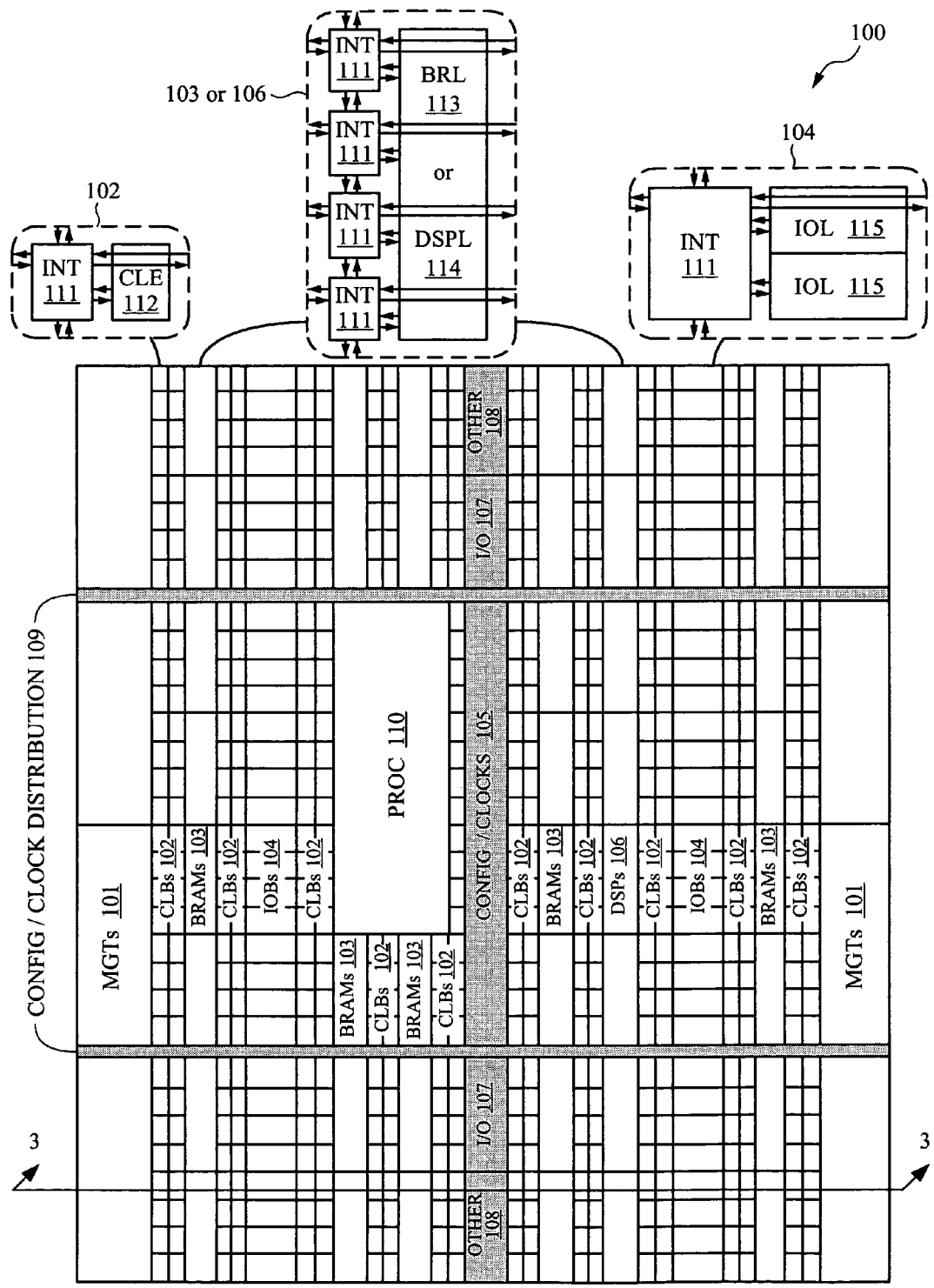
FIG. 1 is a plan view of an integrated circuit showing the arrangement of circuit elements according to an embodiment of the present invention.

Turning first to FIG. 1, a block diagram of a circuit for implementing circuit and methods for enabling transferring data according to an embodiment of the present invention is shown. In particular, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. Similarly the circuits and methods of the present invention could be implemented in any device, including any type of programmable logic device, having memory.

Figure 2:
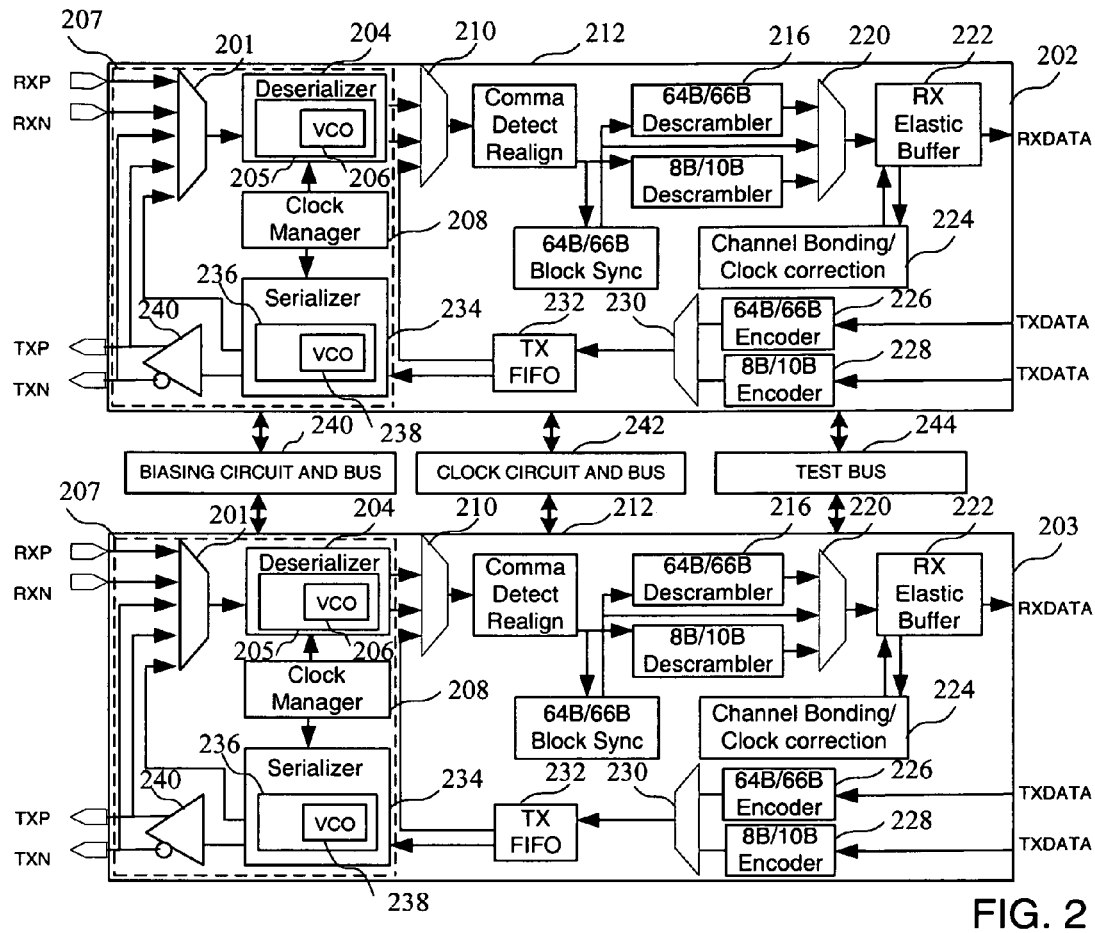
FIG. 2 is a block diagram of a data transceiver pair and associated buses according to an embodiment of the present invention.

Turning now to FIG. 2, a block diagram of a data transceiver pair and associated buses according to an embodiment of the present invention is shown. Because the MGT pair comprises identical data transceivers 202 and 203 (also called multi-gigabyte transceivers or MGTs) on opposite sides of a bus, only a single data transceiver 202 is described. In particular, the data transceiver 202 comprises a multiplexer 201 coupling received or transmitted signals to a deserializer 204 (having a phase-locked loop (PLL) and a voltage controlled oscillator (VCO) 206) of an analog portion 207, the output of which is coupled to a multiplexer 210. The multiplexer 210 generates an output to a comma detect realignment circuit 212. An 8B/10B descrambler 214 receives the output of the comma detect realignment circuit 212. Similarly, a 64B/66B descrambler 216 receives the output of the comma detect realignment circuit 212 by way of a 64B/66B block sync circuit 218. The outputs of the 8B/10B descrambler 214 and a 64B/66B descrambler 216 are coupled to a multiplexer 220, the output of which coupled to a receiver elastic buffer 222. The receiver elastic buffer 222, which receives input from the channel bonding/clock correction block 224, generates the received data RXDATA. The data transceiver 202 also receives transmission data TXDATA which is coupled to a 64B/66B encoder 226 and a 8B/10B encoder 228, the outputs of which are coupled by a multiplexer 230 to a transmission FIFO 232. The output of the transmission FIFO 232 is coupled to a serializer 234. Serializer 234 comprises a phase-locked loop 236 having a voltage controlled oscillator 238 and generating the transmission data TXP and TXN.

Because there are many sensitive nodes within a 10 Gbps serializer/deserializer (SERDES), the analog circuits 207 are formed on the end of the data transceivers 202 and 203. For example, the input to the VCO of the SERDES PLL is sensitive to very low noise levels, where these low levels can pass easily through the substrate. By putting the SERDES on the outside column, the layout of an embodiment of the present invention creates physical isolation by virtue of the physical separation from the other circuits. Further, because there is not a noise source on both sides of the SERDES and thus does not create voltage potentials across the substrate running under the sensitive analog circuits of the SERDES, the layout reduces noise.

The following example illustrates that 62 microvolts of substrate noise presented to the input of the VCO at a modulation frequency of 1 MHz will generate 1 ps of jitter at the output. The transfer function of a VCO is given by:

$$H_{vco}(s) = \frac{K_0}{s},\qquad \text{EQ. 1}$$

where $K_0$ is in radians/second/volt.

At 5 Ghz (10 Gbps), one unit interval (UI) is 100 picoseconds (ps). A modulation of 1 ps is $1/100 \cdot \pi = 0.031$ radians. The above equation uses pi instead of $2 \cdot pi$ because 100 ps is one half cycle. When the modulation frequency is 1 MHz, the period (p) is equal to $2 \cdot \pi \cdot 10^6$ radians/second. Accordingly, Hvco(p)=500 radians/volt, and the voltage=$0.031/500=6.2 \times 10^{-6}$ volts. The VCO output is given by:

$$V_{VCO}(t) = V0 \cdot \sin(2 \cdot \pi \cdot 5 \cdot 10^9 \cdot t + 0.031 \cdot \sin(2 \cdot \pi 10^6 \cdot t)). \qquad \text{EQ. 2}$$

The instantaneous frequency is given by:

$$2 \cdot \pi \cdot 5 \cdot 10^9 \cdot t + 0.031 \cdot 2 \cdot \pi \cdot 10^6 \cdot \sin(2 \cdot \pi \cdot 10^6 \cdot t). \qquad \text{EQ. 3}$$

The frequency of the wobble is 1 MHz, while the amplitude is $0.031 \cdot 2 \cdot \pi \cdot 10^6 = 1.948 \times 10^5$ radians/second. Therefore, the VCO frequency is shifted by 31 kHz at a 1 MHz rate.

Figure 3:
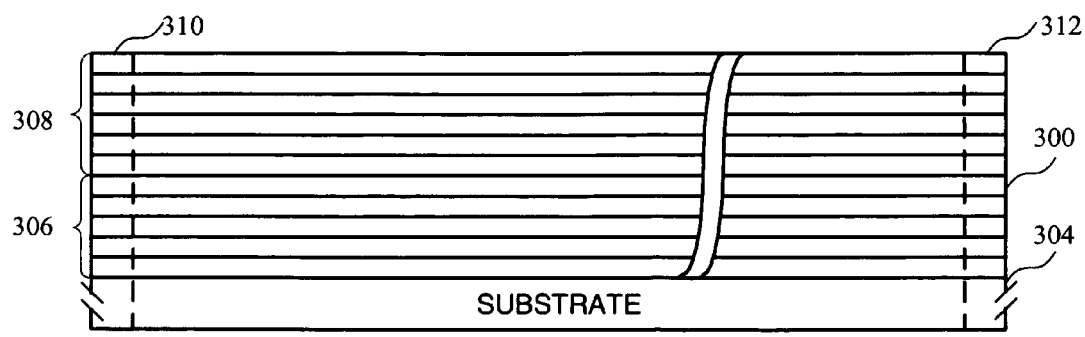
FIG. 3 is a cross section of an integrated circuit showing metal layers according to an embodiment of the present invention.

Turning now to FIG. 3, a cross section of an integrated circuit showing metal layers according to an embodiment of the present invention is shown. In particular, data transceivers of an integrated circuit 300 comprise circuit elements formed in a substrate 304, such as the circuit elements described in FIGS. 1 and 2, and a plurality of metal layers 306 and 308 coupling the circuit elements formed in the substrate. For example, the first 5 layers 306 could comprise conductors used for connecting circuit elements of the various functional blocks, such as BRAM or CLBs of a programmable logic device, while the interconnect circuits (i.e. conductors for connecting the various functional blocks) could be positioned on the upper six layers 308. Even layers of the interconnect layers could be used to route signals in a longitudinal direction, while odd layers could be used to route signals in a lateral direction. The substrate comprises circuit elements related to the data transceiver formed in the columns 310 and 312, while other circuits of a programmable logic device are formed in the substrate between columns 310 and 312.

Figure 4:
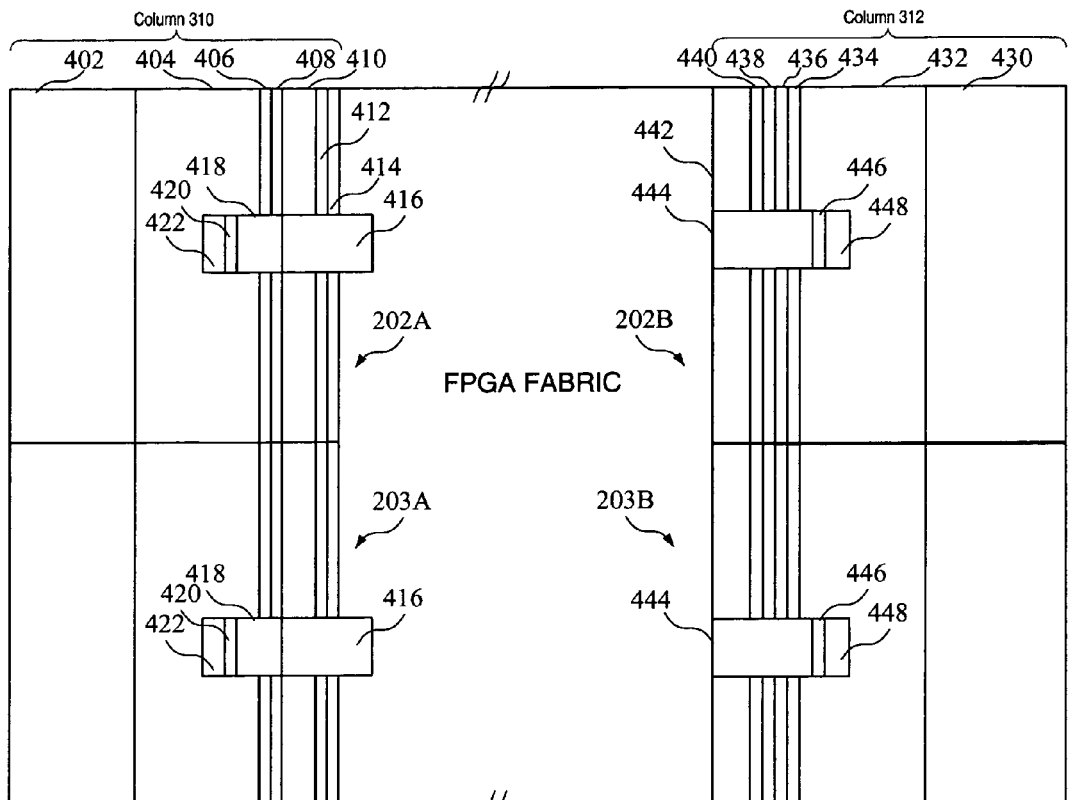
FIG. 4 is a plan view showing the arrangement of circuit elements of data transceivers according to an embodiment of the present invention.

According to one aspect of the invention, data transceivers are positioned on two ends of the integrated circuit, as shown for example by columns 310 and 312 (which will be shown in more detail in reference to FIG. 4). Because the data transceivers do not require interconnect circuits, all eleven layers in the region occupied by the data transceivers as shown could be used for the data transceivers. That is, unlike the portion of the layers having conductors for the functional blocks which are restricted to a first number of metal layers which is less than the total number of metal layers (i.e. leaving some metal layers for the interconnects between the functional blocks), the connections and buses for the data transceivers could be spread out over a greater number of layers than the first number of layers used for the functional blocks of the other parts of the circuit (e.g. all of the layers 306 and 308). Such a positioning of the data transceivers on the ends of the integrated circuit (i.e. preferably both the circuit elements formed in the substrate and some or all of the metal layers connecting the circuit elements) provides improved noise immunity, resource sharing, routing resource availability and ease of implementation, as will be described in more detail below. An example of a data transceiver could be for example a RocketPHY 10 Gbps serial data transceiver available from Xilinx, Inc., San Jose, Calif.

Turning now to FIG. 4, a plan view shows an arrangement of circuit elements of data transceivers according to an embodiment of the present invention. In particular, column 310, which shows the layout of an MGT pair 202A and 203A, comprises a physical media attachment (PMA) sub-column 402 which comprises analog circuits for transmitting and receiving data. Because the analog circuits are generally more sensitive to noise, the sub-column having analog circuit is preferably positioned on the end of column 310. A sub-column 404 comprising digital circuits is preferably positioned adjacent to the sub-column having the analog circuits. A plurality of interconnect sub-columns are also positioned inside of the sub-columns of digital circuits. In particular, the interconnect sub-columns comprise a dynamic MCs column 406, an initial term column 408, an interconnect column 410, an interface column 412, and a route inverter column 414. Finally, an HCLK region 416, an empty space 418, an HCLK termination region 420 and a dynamic controller 422 enable the transfer of clock signals across the columns of the first MGT. Similar HCLK regions enabling the transfer of clock signals across the columns of the second MGT are also shown. The arrangement of circuits in FIG. 4 applies to both circuit elements formed in the substrate as well as conductors on the metal layers associated with the various circuits of the data transceivers. Although there will be conductors of metal layers extending between the various columns providing signals between circuits of the columns, there will generally be fewer metal layers over the analog circuit elements of the substrate because the analog circuits elements are on the end.

According to another aspect of the invention, columns having analog and digital circuits are preferably "mirrored" on the other side of the integrated circuit. That is, a second set of columns is provided on the other side of the FPGA fabric which generally provides the circuits for implementing an FPGA as described in reference to FIG. 2. Column 312 comprises another MGT pair 202B and 203B having another column of analog circuits 430 positioned on the end of the integrated circuit, and a column of digital circuits 432 positioned inside of the analog circuits. A plurality of interconnect sub-columns are also positioned inside of the sub-columns of digital circuits of column 312. It should be noted that while the digital and analog circuit columns are preferably mirrored (i.e. the analog circuit on the outside and the digital circuit on the inside), the interface columns are preferably not mirrored. The interface columns are formed in any order as needed. In particular, the interconnect sub-columns of column 312 as shown comprise a route inverter column 434, a dynamic MCs column 436, an initial term column 438, an interface column 440, and an interconnect column 442. Finally, an HCLK region 444, an HCLK termination region 446 and a dynamic controller 448 enable the transfer of clock signals across the columns. While FIG. 4 shows two data transceivers pairs in the two columns 310 and 312, additional MGT pairs could be employed above and below the data transceivers according to the present invention. The two data transceiver pairs are merely shown by way of example.

Figure 5:
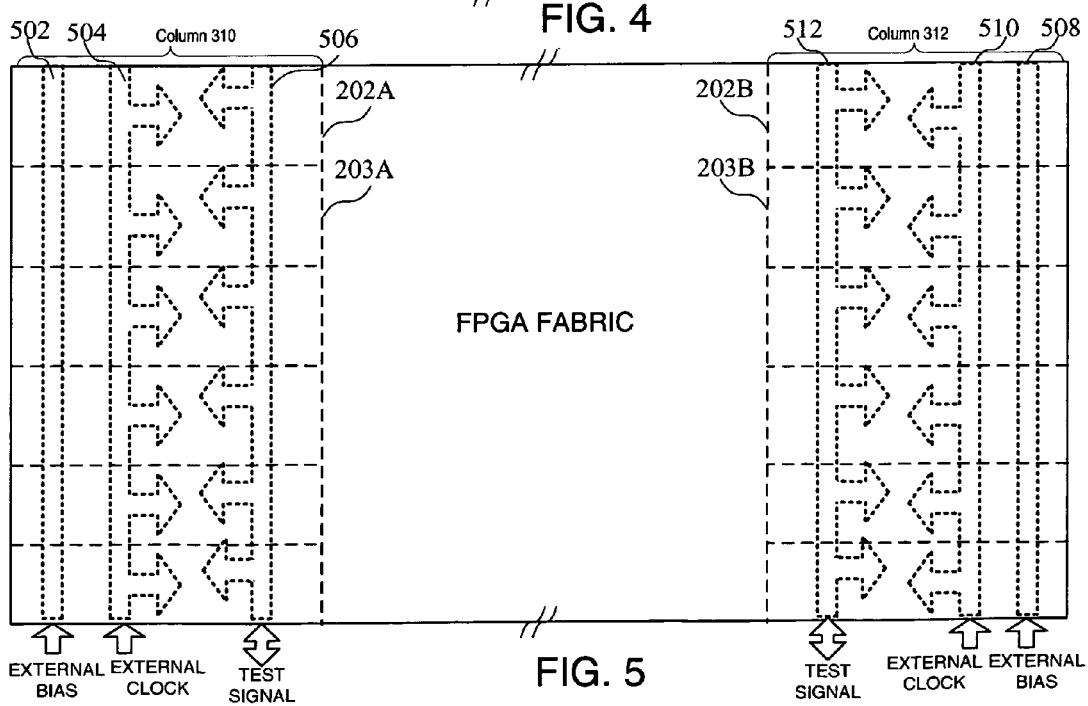
FIG. 5 is a plan view showing the arrangement of buses in a region occupied by data transceivers according to an embodiment of the present invention.

Turning now to FIG. 5, a plan view shows the arrangement of buses in a region occupied by data transceivers according to an embodiment of the present invention. According to another aspect of the invention, because interconnect circuits are not required in the columns having data transceivers as they are in portions of the FPGA fabric having functional blocks, it is possible to easily include various buses extending between the data transceivers. For example, an external bias could be applied to the integrated circuit and routed between pairs of data transceivers by way of an external bias bus 502. Similarly, an external clock could be coupled to a vertical clock bus 504 to couple clock signals from an external clock, or a clock provided by an HCLK row, for example. The vertical clock bus could also be coupled to the FPGA fabric. Finally, test signals could be coupled to a test bus 506, and routed between the data transceivers pairs. A similar external bias bus 508, external clock bus 510 and test signal bus 512 could be employed in the column 312. The buses could be positioned in any layers of the columns 310 and 312. Similarly, the circuits for the data transceivers could be positioned within the buses in as many layers of 306 and 308 as necessary.

Turning now to FIG. 6, a flow chart shows a method of positioning of circuit elements in an integrated circuit according to an embodiment of the present invention. In particular, a first column of circuits comprising a plurality of data transceivers is positioned on a first end of an integrated circuit at a step 602. The circuits of the data transceivers are then arranged in a plurality of sub-columns at a step 604. A sub-column of analog circuits are positioned closer to the first end of the integrated circuit than a sub-column of digital circuits at a step 606. A plurality of interconnect sub-columns are also positioned on the opposite side of the digital circuits from the analog circuits at a step 608. The plurality of interconnect sub-columns are arranged in a pre-determined configuration at a step 610. A plurality of columns is positioned to enable a programmable logic device on the integrated circuit at a step 612. A second column of circuits comprising a second plurality of data transceivers is positioned on a second end of the integrated circuit on an opposite end of the columns enabling a programmable logic circuit at a step 614. The second column of circuits is arranged as a plurality of sub-columns at a step 616. A sub-column of analog circuits is positioned closer to the second end of the integrated circuit than a sub-column of digital circuits at a step 618. A plurality of interconnect sub-columns is also positioned on the opposite side of the digital circuits from the analog circuits at a step 620. Finally, the plurality of inter-connect sub-columns is arranged in another predetermined configuration at a step 622. The circuits could be arranged as shown for example in FIG. 4, or in some other suitable arrangement.

Turning now to FIG. 7, a flow chart shows a method of forming an integrated circuit according to an embodiment of the present invention. In particular, a programmable logic portion having functional blocks is formed using a first plurality of metal layers adjacent to a plurality of interconnect layers at a step 702. The programmable logic portion of the integrated circuit is arranged in columns, wherein each column substantially comprises circuits having a predetermined class of programmable functions at a step 704. A first column comprising a plurality of data transceivers positioned on a first end of the integrated circuit is formed using a second plurality of metal layers which is greater than the first plurality of metal layers at a step 706. An analog circuit column of the first column is positioned closer to the first end of the integrated circuit than a digital circuit column at a step 708. A plurality of interconnect sub-columns is positioned on the opposite side of the digital circuits from the analog circuits at a step 710. The plurality of interconnect sub-columns is arranged in a predetermined configuration at a step 712. A second column comprising a plurality of data transceivers is formed using the second plurality of metal layers at a step 714. The second column is positioned on a second end of the integrated circuit which is opposite the first end at a step 716. An analog circuit column of the second column is positioned closer to the second end of the integrated circuit than the digital circuit column at a step 718. A plurality of interconnect sub-columns is positioned on the opposite side of the digital circuits from the analog circuits at a step 720. Finally, the plurality of interconnect sub-columns are arranged in a second predetermined configuration at a step 722.

It can therefore be appreciated that the new and novel integrated circuit and method of positioning circuit elements on an integrated circuit has been described. It will be appreciated by those skilled in the art that, particular the teaching herein, numerous alternatives and equivalents will be seen to exist which incorporate the disclosed invention. As a result, the invention is not to be limited by the foregoing embodiments, but only by the following claims.

The invention claimed is:

1. An integrated circuit formed on a substrate and having a plurality of data transceivers, said integrated circuit comprising:
a plurality of circuit elements of data transceivers formed in said substrate and positioned in a column extending in a first direction on an end of said integrated circuit, wherein said plurality of circuit elements in said column comprises analog circuit elements positioned in a sub-column closer to the end of said integrated circuit than digital circuit elements positioned in a sub-column;
a plurality of circuit elements formed in said substrate and positioned adjacent to said plurality of circuit elements of data transceivers;
a plurality of buses, each bus comprising conductors extending in said first direction across said plurality of circuit elements of each data transceiver of said plurality of data transceivers over a portion of said substrate having said plurality of circuit elements of data transceivers; and
a plurality of interconnect elements providing connections between said plurality of circuit elements of data transceivers formed in said substrate and said plurality of circuit elements formed in said substrate and positioned adjacent to said plurality of circuit elements of data transceivers.

2. The integrated circuit of claim 1 further comprising a second plurality of circuit elements of data transceivers formed in a second column of said substrate.

3. The integrated circuit of claim 2 wherein said second plurality of circuit elements of data transceivers formed in said second column is positioned on a second end of said integrated circuit.

4. The integrated circuit of claim 2 wherein said second plurality of circuit elements of data transceivers formed in said second column comprises analog circuit elements in a sub-column positioned closer to a second end of said integrated circuit than circuit elements in a sub-column.

5. The integrated circuit of claim 1 wherein said plurality of circuit elements formed in said substrate and positioned adjacent to said plurality of circuit elements of said data transceivers comprises programmable logic circuits.

6. An integrated circuit formed on a substrate and having a plurality of data transceivers, said integrated circuit comprising:
a first plurality of circuit elements of data transceivers formed in said substrate and positioned in a first column extending in a first direction on a first end of said integrated circuit, wherein said first plurality of circuit elements of data transceivers formed in said first column comprises analog circuit elements in a sub-column positioned closer to said first end of said integrated circuit than digital circuit elements in a sub-column, wherein the integrated circuit comprises a plurality of buses, each bus comprising conductors extending in said first direction across said first plurality of circuit elements of each data transceiver of said plurality of data transceivers over a portion of said substrate having said first plurality of circuit elements of data transceivers;
a second plurality of circuit elements of data transceivers formed in said substrate and positioned in a second column on a second end of said integrated circuit, wherein said second plurality of circuit elements of data transceivers positioned in said second column comprises analog circuit elements in a sub-column positioned closer to said second end of said integrated circuit than digital circuit elements in a sub-column; and
a third plurality of circuit elements formed in said substrate and positioned between circuit elements of said first plurality of data transceivers and circuit elements of said second plurality of data transceivers, said third plurality of circuit elements coupled to said first plurality of circuit elements of data transceivers and said second plurality of circuit elements of data transceivers by a plurality of interconnect elements.

7. The integrated circuit of claim 6 wherein each said data transceiver comprises an interface having a sub-column of circuit elements formed in said substrate and positioned on the opposite side of said digital circuit elements from said analog circuit elements.

8. The integrated circuit of claim 7 wherein each said interface having a sub-column of circuit elements comprises circuits arranged in a plurality of sub-columns, wherein said plurality of sub-columns of said interface associated with said first plurality of data transceivers comprises a different functionality and are arranged in a first configuration and said plurality of sub-columns of said interface associated with said second plurality of data transceivers comprises a different functionality and are arranged in a second configuration which is different than said first configuration.

9. The integrated circuit of claim 6 further comprising a plurality of metal layers associated with said first plurality of data transceivers and positioned in said first column.

10. The integrated circuit of claim 9 further comprising a plurality of metal layers associated with said second plurality of data transceivers and positioned in said second column.

11. An integrated circuit formed on a substrate and having a plurality of data transceivers, said integrated circuit comprising:
 a programmable logic portion comprising functional blocks, wherein circuits within said functional blocks are connected by a first plurality of metal layers;
 a first plurality of data transceivers coupled to said programmable logic portion and positioned in a first column extending in a first direction on a first end of said integrated circuit, further comprising conductors formed in said first column by a second plurality of metal layers which is greater than said first plurality of metal layers and coupled to said first plurality of data transceivers in said first column;
 a plurality of buses formed using metal layers of said second plurality of metal layers, each bus comprising conductors extending in said first direction across each data transceiver of said first plurality of data transceivers over a portion of said substrate having said first plurality of data transceivers; and
 a second plurality of data transceivers coupled to said programmable logic portion and positioned in a second column on a second end of said integrated circuit, further comprising conductors formed in said second column by said second plurality of metal layers and coupled to said second plurality of data transceivers in said second column.

12. The integrated circuit of claim 11 further comprising interconnect layers positioned adjacent to said first plurality of layers.

13. The integrated circuit of claim 11 wherein said first plurality of data transceivers formed in a first column has analog circuit elements formed in a first sub-column and digital circuit elements formed in a second sub-column, said analog circuit elements formed in said first sub-column being positioned closer to said first end of said integrated circuit than said digital circuit elements formed in said second sub-column.

14. The integrated circuit of claim 13 wherein said second plurality of data transceivers positioned in a second column has analog circuit elements formed in a third sub-column and a digital circuit elements formed in a fourth sub-column, said analog circuit elements formed in said third sub-column being positioned closer to said second end of said integrated circuit than said digital circuit elements formed in said fourth sub-column.

15. The integrated circuit of claim 11 wherein said programmable logic portion comprises different types of programmable logic blocks arranged in a plurality of columns, each said column substantially comprising circuits having a predetermined class of programmable functions.

16. A method of positioning circuits of an integrated circuit, said method comprising the steps of:
 forming a programmable logic portion having functional blocks, wherein circuits within said functional block are connected using a first plurality of metal layers;
 forming a plurality of data transceivers in a first column extending in a first direction and positioned on a first end of said integrated circuit using a second plurality of metal layers which is greater than said first plurality of metal layers; and
 forming a plurality of buses using metal layers of said second plurality of metal layers, each bus comprising conductors extending in said first direction across each data transceiver of said plurality of data transceivers over a portion of a substrate of said integrated circuit having said plurality of data transceivers.

17. The method of claim 16 wherein said step of forming a plurality of data transceivers in a first column comprises forming analog circuits in a first sub-column and digital circuits in a second sub-column, said analog circuits being positioned closer to said first end of said integrated circuit than said digital circuits.

18. The method of claim 17 further comprising a step of forming a plurality of data transceivers positioned in a second column on a second end of said integrated circuit which is opposite said first end.

19. The method of claim 18 wherein said step of forming a plurality of data transceivers in a second column comprises forming an analog circuits in a third sub-column and digital circuits in a fourth sub-column, said analog circuits being positioned closer to said second end of said integrated circuit than said digital circuits.

20. The method of claim 16 wherein said step of forming a programmable logic portion comprises forming circuits in a plurality of columns, each said column substantially comprising circuits having a predetermined class of programmable functions.

\* \* \* \* \*